(12) United States Patent
Natarajan et al.

(10) Patent No.: US 10,349,009 B1
(45) Date of Patent: Jul. 9, 2019

(54) PANORAMIC STREAMING OF VIDEO WITH USER SELECTED AUDIO

(71) Applicant: Altia Systems, Inc., Cupertino, CA (US)

(72) Inventors: Ram Natarajan, Cupertino, CA (US); Naveed Alam, Cupertino, CA (US); Yashket Gupta, Santa Clara, CA (US); Lars Herlitz, Atherton, CA (US); Aurangzeb Khan, Portola Valley, CA (US)

(73) Assignee: Altia Systems, Inc., Cupertino, CA (US)

( * ) Notice: Subject to any disclaimer, the term of this patent is extended or adjusted under 35 U.S.C. 154(b) by 29 days.

(21) Appl. No.: 14/058,192

(22) Filed: Oct. 18, 2013

Related U.S. Application Data (60) Provisional application No. 61/715,813, filed on Oct. 18, 2012.

(51) Int. Cl.
*H04N 7/15* (2006.01)
(52) U.S. Cl.
CPC .................................... *H04N 7/15* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,335,011 A | * | 8/1994 | Addeo et al. | 348/14.1 |
| 5,761,320 A | * | 6/1998 | Farinelli | H04M 1/723 |
| | | | | 379/101.01 |
| 2004/0175002 A1 | * | 9/2004 | Christensen | H04R 29/007 |
| | | | | 381/59 |
| 2007/0024706 A1 | * | 2/2007 | Brannon, Jr. | H04N 7/17318 |
| | | | | 348/142 |
| 2008/0218586 A1 | * | 9/2008 | Graham et al. | 348/14.09 |
| 2009/0147070 A1 | * | 6/2009 | Marathe | H04N 7/15 |
| | | | | 348/14.09 |
| 2010/0318606 A1 | * | 12/2010 | Sethi et al. | 709/204 |
| 2012/0206566 A1 | * | 8/2012 | Fedoseyeva | 348/38 |
| 2013/0070047 A1 | * | 3/2013 | DiGiovanni | H04N 5/222 |
| | | | | 348/36 |

\* cited by examiner

*Primary Examiner* — Phung-Hoang J Nguyen
(74) *Attorney, Agent, or Firm* — HM Law Group LLP; Vani Moodley, Esq.

(57) ABSTRACT

A method for processing video is disclosed. The method comprises associating a plurality of audio zones with the video; associating a region of interest (ROI) for each of a plurality of client devices to which the video is currently being streamed; for each client device generating custom video comprising a modified video channel associated with the video being streamed to that client, wherein the modified audio channel comprises an enhanced audio for at least one audio zone indicated by the region of interest (ROI) for said client device.

12 Claims, 9 Drawing Sheets

PANORAMIC STREAMING OF VIDEO WITH USER SELECTED AUDIO

This application claims the benefit of priority to U.S. Provisional Patent Application No. 61/715,813, which was filed on Oct. 18, 2012, the entire specification of which is incorporated herein by reference.

FIELD

Embodiments of the invention relate to videoconferencing.

BACKGROUND

Videoconferencing has become increasingly popular as a means for hosting meetings, particularly in a business environment. In a typical use case, a face-to-face meeting may be held at a first location, where the meeting is captured by camera located at said location. The camera then transmits the video of the meeting to multiple second parties, located at remote locations all over the world.

An important component of the video for a meeting is actually the audio associated with the meeting. In connection with the audio, parties receiving a video stream of a meeting in progress need to hear clearly what speakers in the meeting are saying.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, there is provided a method for processing video. The method comprises associating a plurality of audio zones with the video; associating a region of interest (ROI) for each of a plurality of client devices to which the video is currently being streamed; for each client device generating custom video comprising a modified video channel associated with the video being streamed to that client, wherein the modified audio channel comprises an enhanced audio for at least one audio zone indicated by the region of interest (ROI) for said client device.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Embodiments of the present invention disclose systems and methods for processing audio associated with a video based on the concept of a 'region of interest' (ROI).

Figure 1:
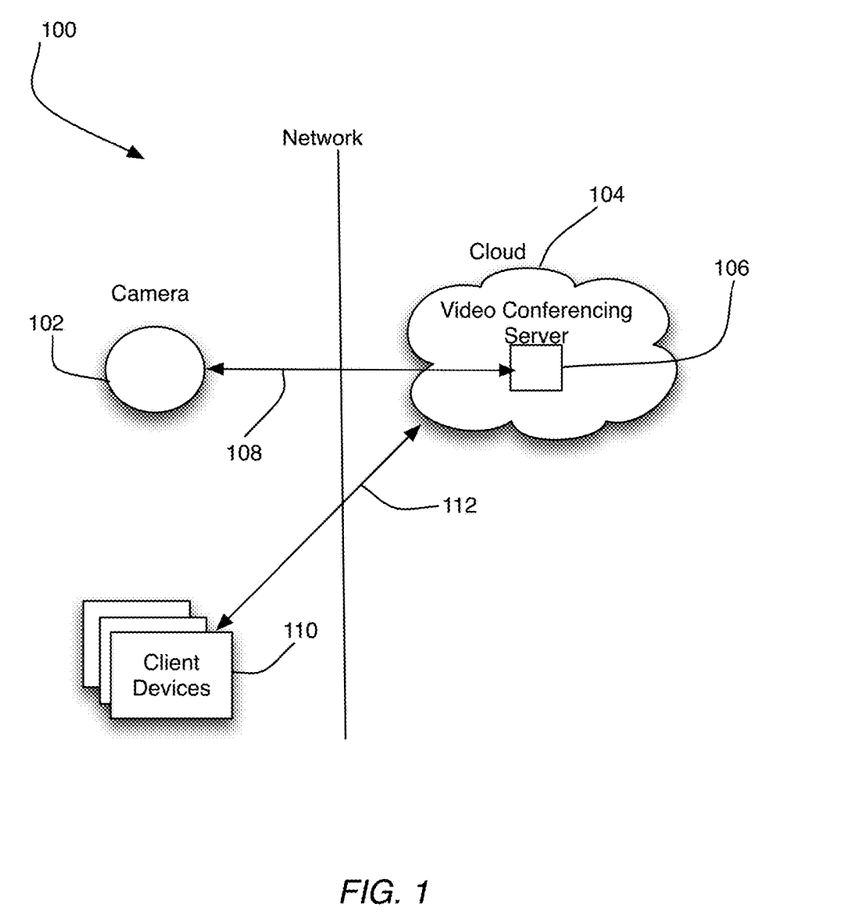
FIG. 1 shows a network environment, within which embodiments of the present invention may be practiced.

Referring to FIG. 1 of the drawings, there is shown an environment 100 within which embodiments of the invention may be practiced. The environment 100 includes a camera 102 configured to capture video associated with a meeting at a first location. For example, the first location may be a conference room at corporation's headquarters, where multiple participants are meeting. The camera 102 may be designed to capture panoramic video associated with said meeting and to stream said meeting to a cloud 104. In particular, the camera 102 may be configured to stream video of the meeting to a videoconferencing server 106 located within the cloud 104 by means of a communications link 108.

In one embodiment, the communications link 108 may include wireless or wired links, and may for example support packet-based communications in accordance with the Internet Protocol (IP).

In one embodiment, the videoconferencing server 106 (which will be described in greater detail later) processes the video received from the camera 102 and supports multiple videoconferencing sessions with a plurality of client devices 110. Each client device 110 may represent any device capable of receiving and rendering video. For example, client devices 110 may include cellphones, tablet computers, notebook computers, etc.

Communications between each of the client devices 110 and the videoconferencing server 106 may be via communications link 112, which is similar to the communications link 108. Is important to appreciate that cloud 104 may include private and/or public clouds.

Figure 2:
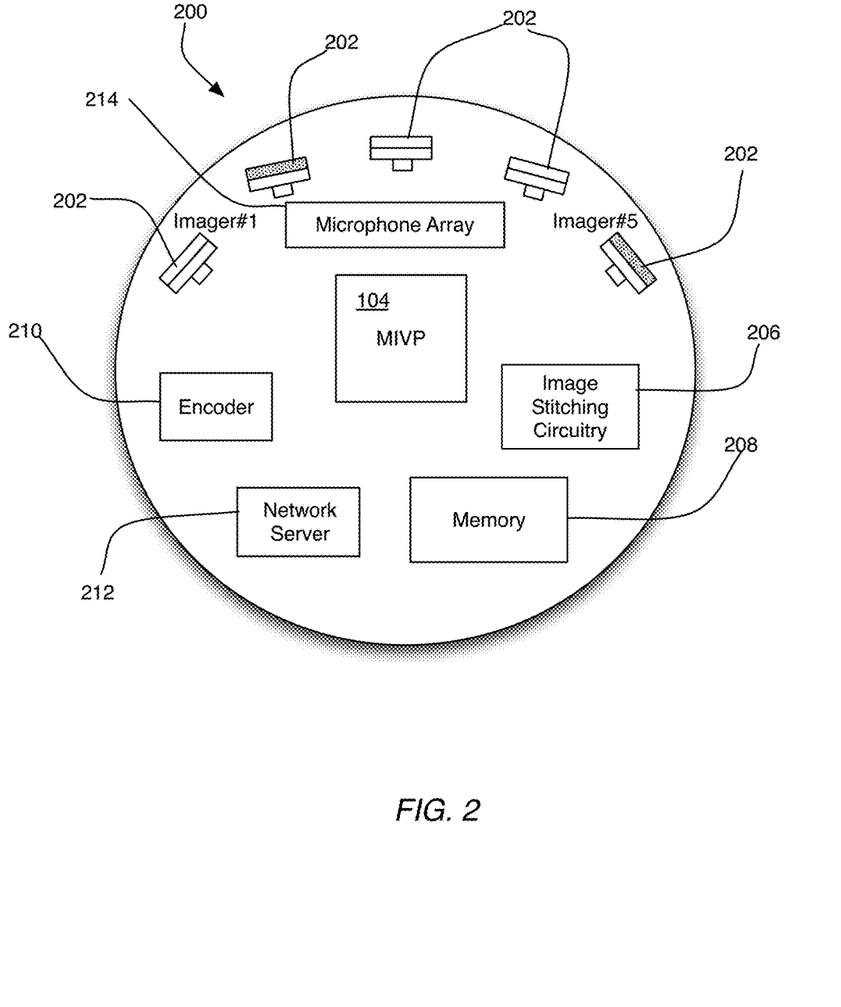
FIG. 2 shows a high-level block diagram of a camera for capturing video at a meeting.

FIG. 2 shows a high-level block diagram of hardware 200 for the camera 102, in accordance with one embodiment. Referring to FIG. 2, the hardware 200 includes multiple imagers/sensors 202 mounted along an arc such that each imager 202 is directed to capture a portion of a scene. Each imager 202 may include suitable sensors, for example charge-coupled device (CCD) or complimentary metal-oxide semiconductor (CMOS) imaging sensors, as is known in the art.

The hardware 200 also includes a multiple imager video processor (MIVP) 204, image stitching circuitry 206, memory 208, an encoder 210, and a one or more network interfaces 210. In one embodiment, digital signals recorded by sensors 202 are sent to MIVP 204 for processing. In one embodiment, the MIVP 204 may execute programs for implementing image processing functions and calibration functions, as well as for controlling the operation of the entire device 200 including its image capture operations. The MIVP 204 may include signal processing functionality for performing image processing, including image filtering, enhancement and for combining multiple fields of view in cooperation with the image stitching circuitry 206. Although shown separately, in some embodiments, the image stitching circuitry 206 may exist as part of the MIVP 204. It is to be understood that components of the device 200 may take the form of hardware, software, firmware, or any combination of hardware, software, and firmware.

Digital signals representing a panoramic image may be stored in memory 208. In one embodiment, the encoder 210 may repack and compress panoramic images before transmission across via a network interface 212, as will be described in greater detail below. The network interfaces 212 may be configured to provide network connectivity to the device 200. As such, the network interfaces 212 may include wireless and wired interfaces, in accordance with different embodiments. For capturing audio, the hardware 200 includes a microphone array 214.

Figure 3:
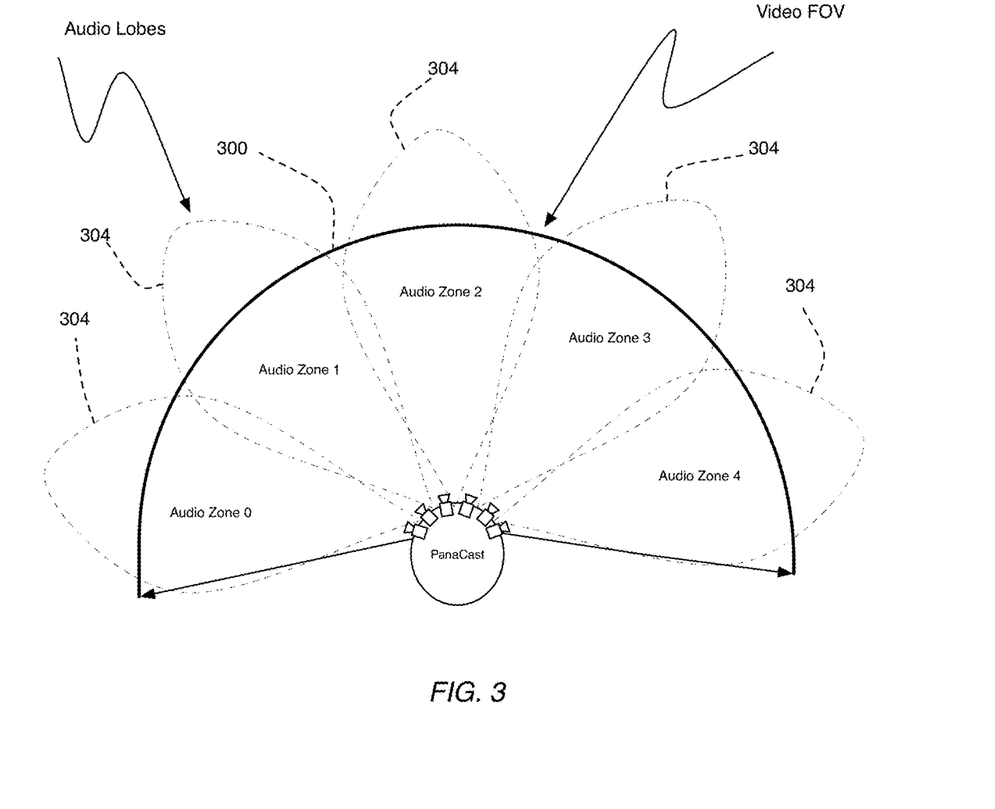
FIG. 3 illustrates the concept of audio zones, in accordance with one embodiment of the invention.

In one embodiment, the camera 102 captures panoramic video with a wide field of view (FOV). For example, the field of view may be >180°. In one embodiment, panoramic video output by the camera 102 may include certain audio zones associated therewith. The concept of audio zones is illustrated in FIG. 3 of the drawings. Referring to FIG. 3, arc 800 represents the field of view associated with the camera 102. As will be seen, the arc 800 spans approximately 180°. In the particular example shown, the video field of view is divided into five audio zones indicated by reference numeral 804, and shown in dotted lines in FIG. 3. In on embodiment, each audio zone is associated with selected microphones within a microphone array. Thus, for each audio zone, the particular microphones that pick up audio for that zone are known within the system 102.

Figure 4:
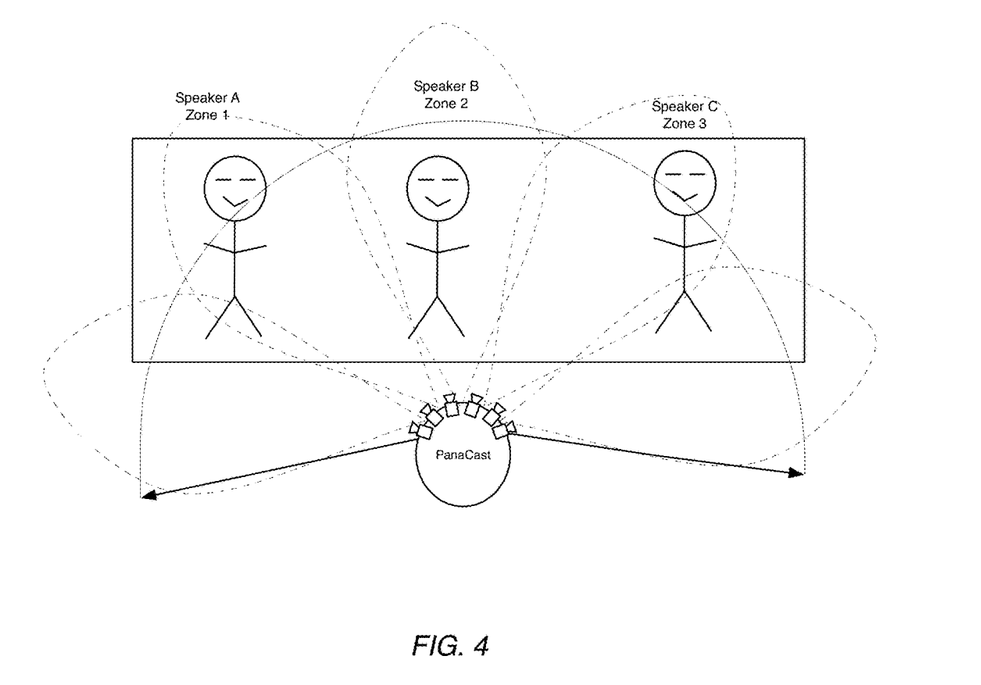
FIG. 4 is a schematic drawing showing speakers associated with certain audio zones, in accordance with once embodiment of the invention.

In one embodiment, based on the position of a speaker relative to the field of view of the entire panoramic video captured by a camera 102, it is possible to associate said speaker with a particular audio zone. This concept is illustrated in FIG. 4 of the drawings, where it can be seen that a speaker A is associated with audio zone 1, a speaker B with audio zone 2, and a speaker C with audio zone 3.

Figure 5:
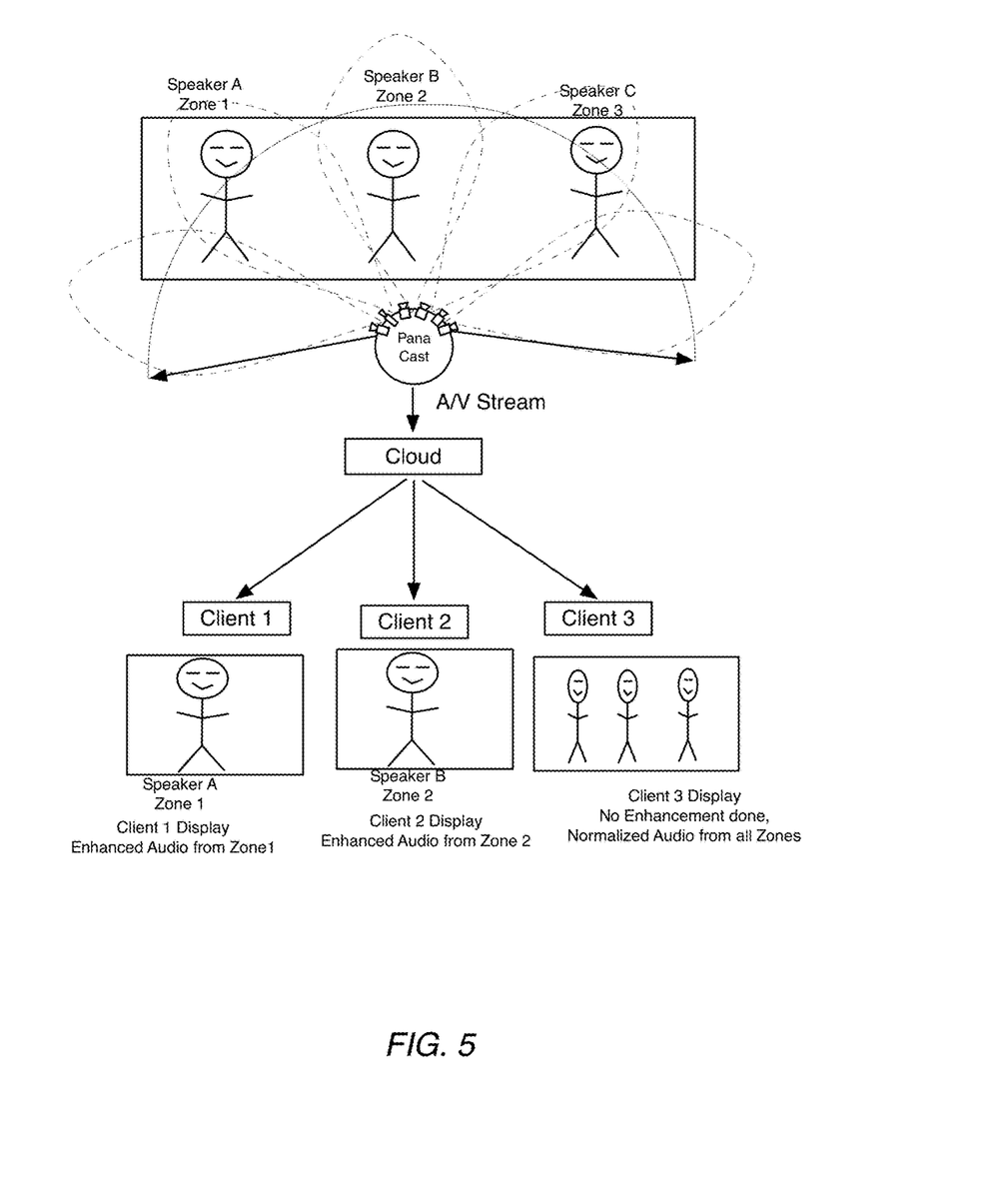
FIG. 5 schematically illustrates how audio may be processed in accordance with the present invention so that said audio may be different for the different viewers based on the viewer's region of interest.

In one embodiment, the videoconferencing server 106 selectively processes video that is streamed to each client device, based on the concept of a region of interest (ROI). In one embodiment, a region of interest is set for each client device. In the illustration of FIG. 5, it will be seen that a speaker A has a region of interest that corresponds to zone 1. Briefly, the concept of region of interest is a construct that informs the videoconferencing server 106 of what portions of the entire panoramic video a particular viewer finds interesting. In one embodiment, region of interest information may be captured based on panning and zooming activities by each individual client device. For example, by using panning and zooming functions on the client device 1, viewer 1 associated with client device 1 would have zoomed the panoramic video received by client 1 to focus on the speaker A. Thus, the videoconferencing server understands that the region of interest for client device 1 centers on the speaker A. In one embodiment, because speaker A is associated with audio zone 1, the videoconferencing server 106 may be configured to selectively enhance the audio associated with zone 1 so that viewer 1 can clearly hear audio associated with the speaker A.

In one embodiment, simultaneous to enhancing the audio for speaker A in zone 1, the videoconferencing server 106 may de-emphasize, mute or otherwise reduce audio associated with other zones for the client device 1. As shown in FIG. 5, for the client device 2, the viewer as zoomed into the speaker B, which informs the videoconferencing server 106 that region of interest for client 2 is speaker B, who is located in audio zone 2. Thus, audio associated with audio zone 2 is boosted or enhanced for the client device 2, whereas audio associated with other zones in the panoramic video may be diminished or reduced.

Continuing with the examples of FIG. 5, for client device 3, no zooming and/or panning activities were detected. Thus, the videoconferencing server 106 has no region of interest associated with the client device 3. As a result, the video that is streamed by the videoconferencing server to the client device 3 includes no audio enhancements.

Figure 6:
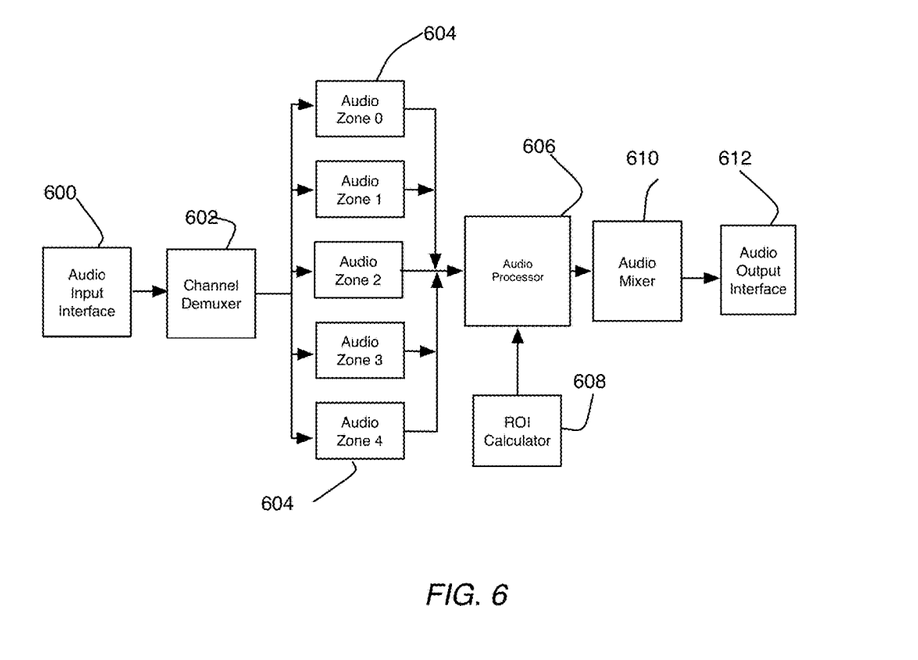
FIG. 6 shows a high-level block diagram of audio processing components associated with a videoconferencing server, in accordance with one embodiment of the invention.

Turning now to FIG. 6 of the drawings, there is shown a high-level block diagram of audio processing components associated with the videoconferencing server 106, in accordance with the one embodiment of the invention. It is to be noted that other components of videoconferencing server 106 have not been shown so as not to obscure to present invention. Such components include call control modules, video encoding logic, video decoding logic, etc. as will be understood by one of ordinary skill in the art.

Referring to FIG. 6 of the drawings, the audio-processing components of the videoconferencing server 106 include an audio input interface 600, a channel de-multiplexor 602, an audio processor 606, region of interest (ROI) calculator 608, an audio mixer 612, and an audio output interface 614. Cooperation of various audio-processing components will now be described with reference to FIG. 7 of the drawings, which shows a flow chart of operations performed by the audio components of FIG. 6.

Figure 7:
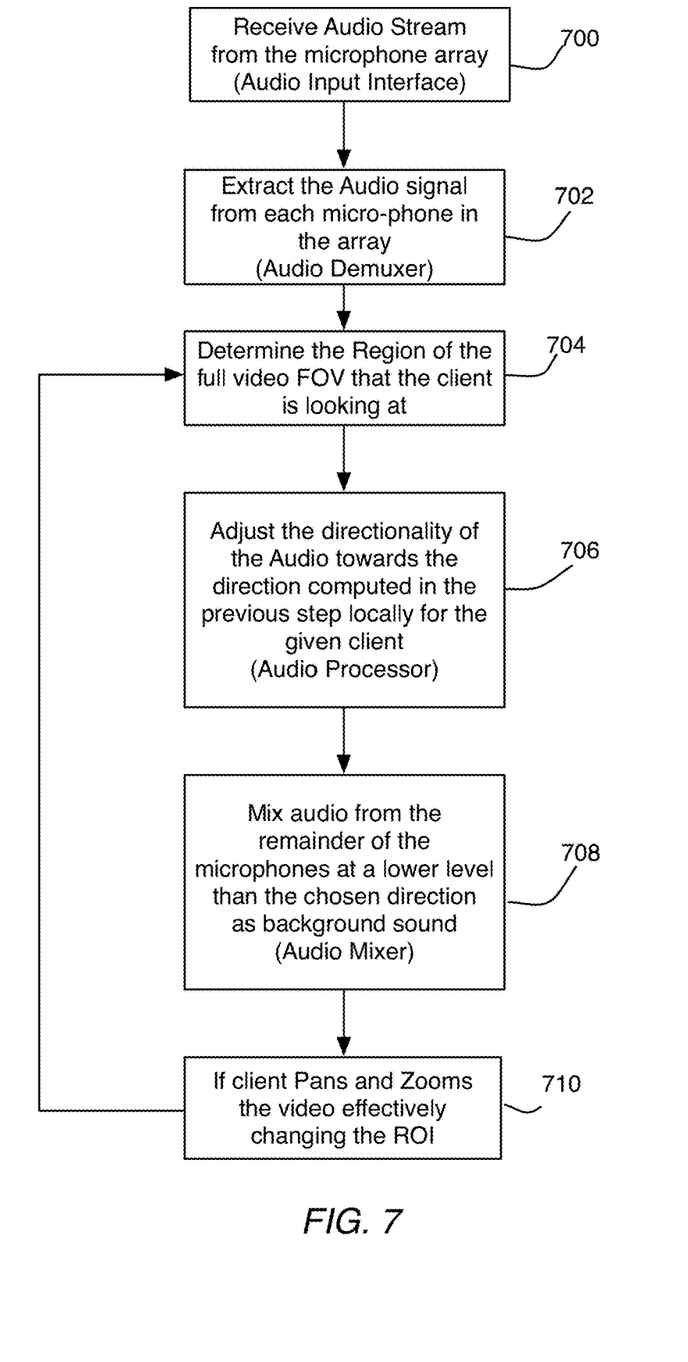
FIG. 7 shows flowchart of a process by processing audio by the videoconferencing server, in accordance with one embodiment.

Referring to FIG. 7, at block 700 an audio stream is received from the camera 102, having been captured by the microphone array 214 of the camera 100. At block 702, the input audio signal is de-multiplexed to extract the audio for each of the audio zones. Referring to FIG. 6, audio for each audio zone is indicated by reference numeral 604. As will be seen, the audio for each audio zone 604 is fed into the audio processor 606. At block 704, the region of interest (ROI) calculator 608 determines a region of interest associated with each particular client device 110. In one embodiment, the region of interest calculator 608 makes this determination based on information received from the client device 110 indicative of zooming and panning operations performed on the client device 110. In one embodiment, the audio processor 606 is configured to (see block 706 of FIG. 7) to adjust the directionality of the audio to coincide with the particular audio zone 604 associated with each client device 110 by the ROI calculator 608. In one embodiment, the audio processor 606 may be configured to amplify audio for the audio zones indicated by the ROI calculator 608 for each client device 110. Simultaneously, the audio processor 606 may be configured to de-amplify those audio zones there are not indicated by the ROI calculator 608. At block 706, audio output from the audio processor 606 is mixed by the components 610 and output to the audio output interface 612. At block 710, the ROI calculator 608 constantly monitors the zooming and panning operations of each client device 110, and uses that information to re-calculate the region of interest for each client.

Figure 8:
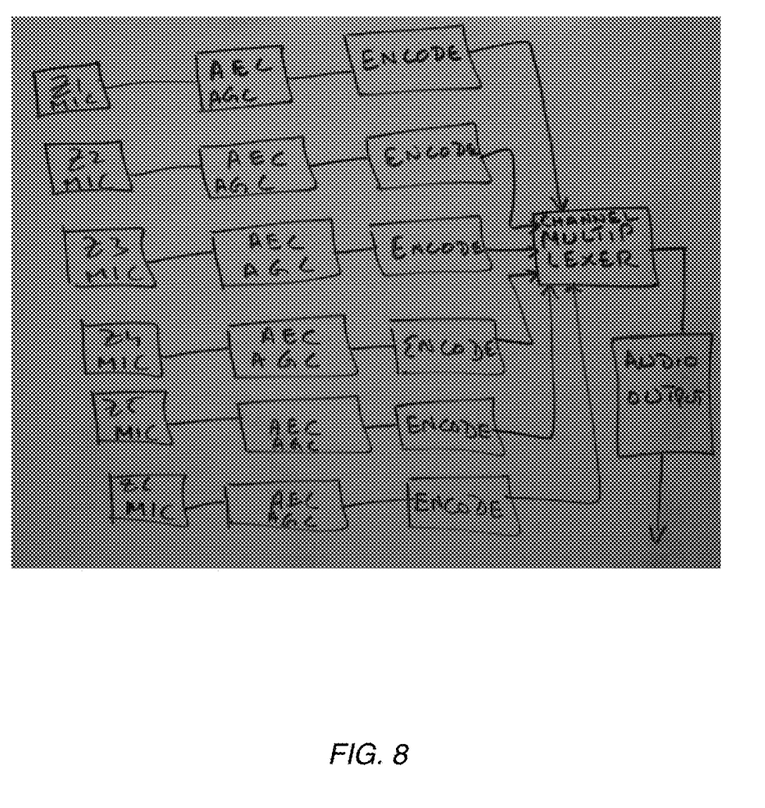
FIG. 8 shows a block diagram for an audio processing sub-system for a camera, in accordance with one embodiment.

FIG. 8 shows a block diagram for an audio processing sub-system 800 for the camera 102, in accordance with one embodiment. The sub-system processes audio may include six microphones and may be configured to process audio in reverse order of the processing by the server 106. In one embodiment, said processing may include pushing audio to AEC/AGC(Audio Echo Cancellation/Automatic Gain Control)→Audio Encoder/compressor→Multiplexer→Output interface.

Figure 9:
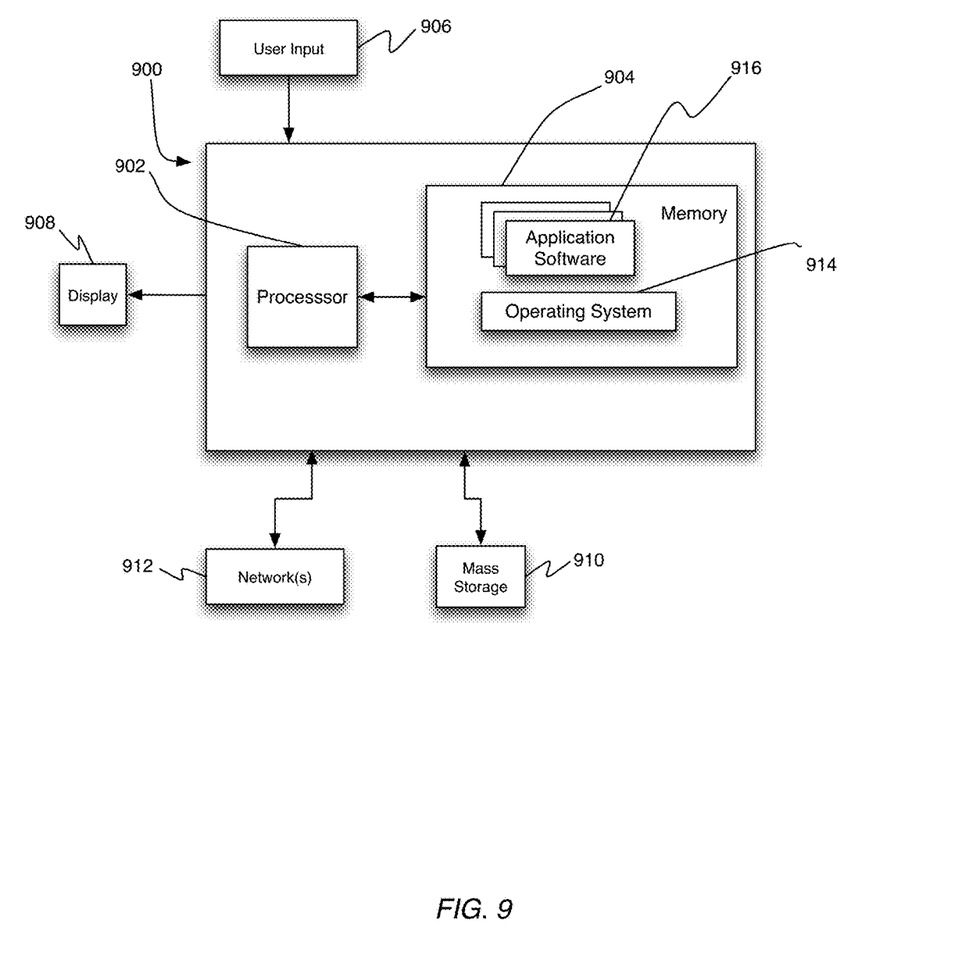
FIG. 9 shows a high-level block diagram of hardware for the videoconferencing server, in accordance with one embodiment.

FIG. 9 shows an example of hardware 900 that may be used to implement video conferencing server 106, in accordance with one embodiment. The hardware 900 may includes at least one processor 902 coupled to a memory 904. The processor 902 may represent one or more processors (e.g., microprocessors), and the memory 904 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 904 may be considered to include memory storage physically located elsewhere in the hardware, e.g. any cache memory in the processor 902, as well as any storage capacity used as a virtual memory, e.g., as stored on a mass storage device.

The hardware 900 also typically receives a number of inputs and outputs for communicating information externally. For interface with a user or operator, the hardware may include one or more user input/output devices 906 (e.g., force-plate, keyboard, mouse, etc.) and a display 908. For additional storage, the hardware 900 may also include one or more mass storage devices 910, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 912 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 912 and each of the components, as is well known in the art.

The hardware 900 operates under the control of an operating system 914, and executes application software 916 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for processing a panoramic-video, comprising:
   associating a plurality of audio zones with the panoramic video;
   associating a particular region of interest (ROI) for each one of a plurality of client devices to which the panoramic-video is currently being streamed based on zoom information inputted by at least one of the plurality of client devices for the panoramic-video being viewed on the each of the plurality of client devices;
   generating, for each of the plurality of client devices, a custom panoramic-video comprising a modified audio channel associated with the panoramic-video being streamed to at least one of the plurality of client devices, wherein
   the modified audio channel is adjusted to coincide with directionality of an audio corresponding to the associated region of interest (ROI) inputted by the at least one of said client device, and wherein
   the modified audio channel is adjusted to mute audio corresponding to the audio zones other than the audio zone associated with the ROI.

2. The method of claim 1, further comprising determining the region of interest (ROI) for each client device.

3. The method of claim 2, wherein determining the region of interest (ROI) for each client device is based on panning information for video being viewed by the client device.

4. The method of claim 1, wherein the modified audio channel comprises at least two audio zones with enhanced audio.

5. A system, comprising:
   a processor; and
   a memory coupled to the processor, the memory storing instructions which when executed by the processor causes the system to perform a method, comprising:
   associating a plurality of audio zones with a panoramic video;
   associating a particular region of interest (ROI) for each one of a plurality of client devices to which the panoramic-video is currently being streamed based on zoom information inputted by at least one of the plurality of client devices for the panoramic-video being viewed on the each of the plurality of client devices;
   generating, for each of the plurality of client devices, a custom panoramic-video comprising a modified audio channel associated with the panoramic-video being streamed to at least one of the plurality of client devices, wherein
   the modified audio channel is adjusted to coincide with directionality of an audio corresponding to the associated region of interest (ROI) inputted by the at least one of said client device, and wherein
   the modified audio channel is adjusted to mute audio corresponding to the audio zones other than the audio zone associated with the ROI.

6. The system of claim 5, wherein the method further comprises determining the region of interest (ROI) for each client device.

7. The system of claim 5, wherein determining the region of interest (ROI) for each client device is based on panning information for video being viewed by the client device.

8. The system of claim 5, wherein the modified audio channel comprises at least two audio zones with enhanced audio.

9. A non-transitory computer-readable medium comprising instructions which when executed by a processor causes a system to perform a method comprising:
   associating a plurality of audio zones with a panoramic video;
   associating a particular region of interest (ROI) for each one of a plurality of client devices to which the panoramic-video is currently being streamed based on zoom information inputted by at least one of the plurality of client devices for the panoramic-video being viewed on the each of the plurality of client devices;
   generating, for each of the plurality of client devices, a custom panoramic-video comprising a modified audio channel associated with the panoramic-video being streamed to at least one of the plurality of client devices, wherein
   the modified audio channel is adjusted to coincide with directionality of an audio corresponding to the associated region of interest (ROI) inputted by the at least one of said client device, and wherein
   the modified audio channel is adjusted to mute audio corresponding to the audio zones other than the audio zone associated with the ROI.

10. The computer-readable medium of claim 9, wherein the method further comprises determining the region of interest (ROI) for each client device.

11. The computer-readable medium of claim 10, wherein determining the region of interest (ROI) for each client device is based on panning information for video being viewed by the client device.

12. The computer-readable medium of claim 9, wherein the modified audio channel comprises at least two audio zones with enhanced audio.

* * * * *